United States Patent
Ichikawa (10) Patent No.: US 6,301,253 B1
(45) Date of Patent: Oct. 9, 2001

(54) ATM CELL BUFFER CIRCUIT AND PRIORITY ORDER ALLOCATING METHOD AT ATM SWITCHING SYSTEM

(75) Inventor: Ken Ichikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/062,553

(22) Filed: Apr. 20, 1998

(30) Foreign Application Priority Data

Apr. 18, 1997 (JP) .................................................... 9-101265

(51) Int. Cl.[7] .................................................. H04L 12/28
(52) U.S. Cl. ........................ 370/395; 370/416; 370/230
(58) Field of Search .................................... 370/229, 230, 370/231, 232, 234, 235, 236, 411, 412, 413, 414, 415, 416, 417, 498, 395, 392, 397, 399, 428, 429, 444; 711/154, 158; 709/240, 241, 242; 710/29, 36, 39, 40, 41

(56) References Cited

U.S. PATENT DOCUMENTS

| | | | | |
|---|---|---|---|---|
| 5,499,238 | * | 3/1996 | Shon ..................................... | 370/411 |
| 5,533,009 | * | 7/1996 | Chen ..................................... | 370/411 |
| 5,550,823 | * | 8/1996 | Irie ........................................ | 379/412 |
| 5,555,264 | * | 9/1996 | Sallberg ................................ | 370/411 |
| 5,771,234 | * | 6/1998 | Wu ........................................ | 370/418 |
| 5,828,653 | * | 10/1998 | Goss ..................................... | 370/412 |
| 5,838,677 | * | 11/1998 | Kozaki ................................. | 370/412 |
| 5,923,656 | * | 7/1999 | Duan ..................................... | 370/412 |
| 6,041,038 | * | 3/2000 | Aimoto ................................. | 370/229 |

FOREIGN PATENT DOCUMENTS 7-297840   11/1995   (JP) .

* cited by examiner

Primary Examiner—Wellington Chin
Assistant Examiner—Steven Nguyen
(74) Attorney, Agent, or Firm—Sughrue, Mion, Zinn, Macpeak & Seas, PLLC

(57) ABSTRACT

An ATM cell buffer circuit including an output buffer type ATM switch for switching ATM cells and an input buffer unit provided for each line, read control means of the input buffer unit for reading a cell from a queue which temporarily stores an input cell and transmitting the same to the output buffer type ATM switch including a state control table, a delay quality class setting table for setting cell reading priority for each priority class assigned to an input cell, table value modifying means for modifying a set value of the delay quality class setting table as required and cell reading means for determining priority order to read a cell based on the delay quality class setting table and the state control table.

20 Claims, 4 Drawing Sheets

(LOW) 2 → ⋯ → y-1 (HIGH)

FIG. 3

(1) TIME SLOT FOR MODIFYING DELAY QUALITY CLASS SETTING TABLE
(2) SELECTION OF QUEUE WHICH WILL TRANSMIT CELL TO SWITCH UNIT

ATM CELL BUFFER CIRCUIT AND PRIORITY ORDER ALLOCATING METHOD AT ATM SWITCHING SYSTEM

BACKGROUND OF THE INVENTION

1. Field of the Invention

The present invention relates to an ATM cell switching device and, more particularly, to an ATM cell buffer circuit and a priority order allocating method at an ATM switching system which conduct priority control of the order of ATM cell transmission at the time of occurrence of ATM cell congestion.

2. Description of the Related Art

One of conventional ATM cell buffer circuits of this kind is, for example, the ATM cell buffer circuit disclosed in Japanese Patent Laying-Open (Kokai) No. Heisei 7-297840, entitled "Priority Controlling Method at Output Buffer Type ATM Switch". The ATM cell buffer circuit recited in the literature, which is disposed at an input line unit located at the preceding stage of a switch unit in an ATM switching system, conducts reduction of a cell discard rate and control of a cell transmission delay in the ATM switching system according to a cell discard rate and a cell transmission delay time limit required for each connection.

Figure 4:
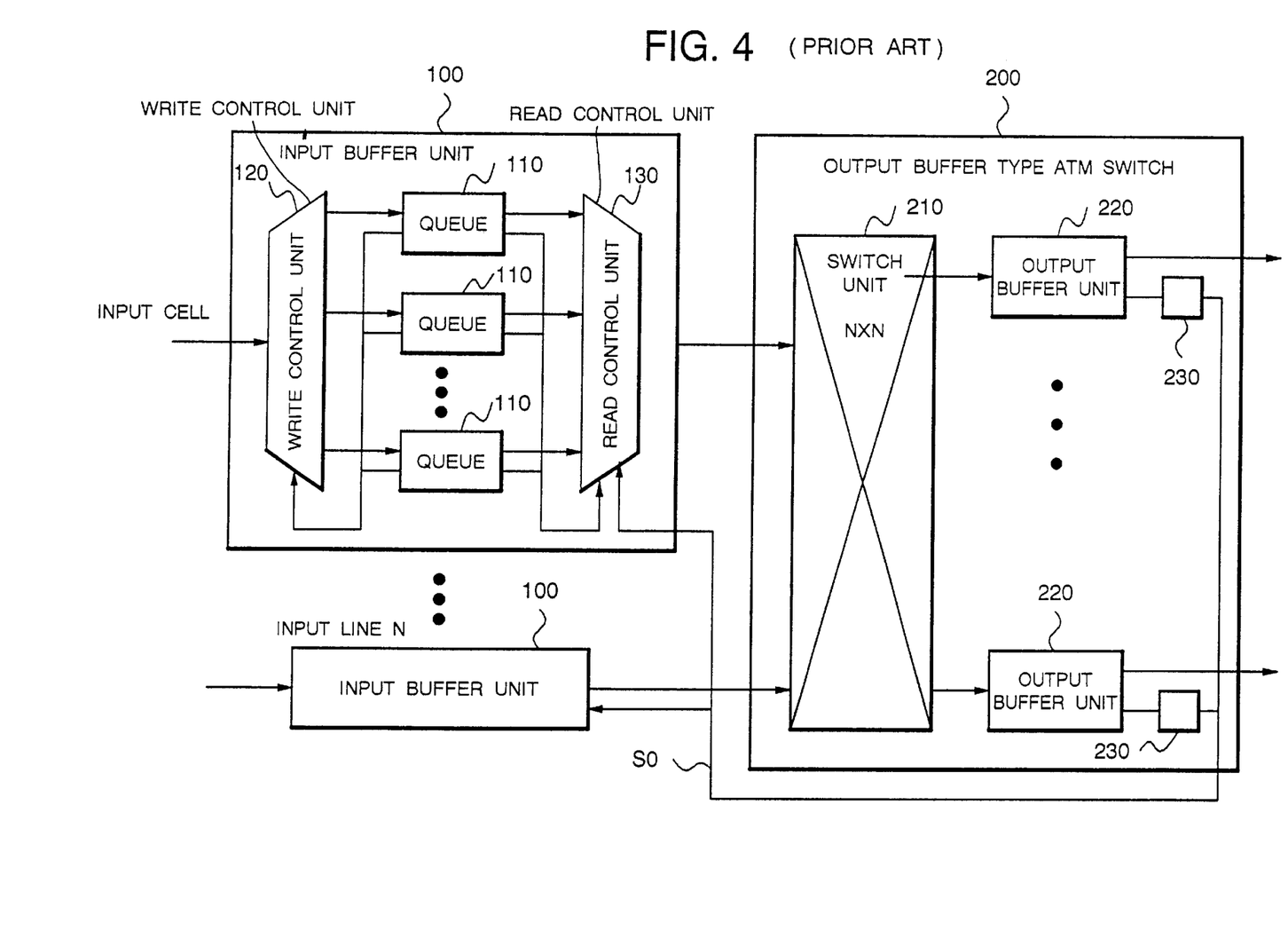
FIG. 4 is a block diagram showing structure of the ATM cell buffer circuit.

FIG. 4 is a block diagram showing structure of a conventional ATM cell buffer circuit. As illustrated in FIG. 4, the ATM buffer circuit includes an input buffer unit 100 provided for each line and an output buffer type ATM switch 200. The input buffer unit 100 conducts priority control based on a discard quality class and a delay quality class assigned to an input cell as a parameter. The output buffer type ATM switch 200 conducts switching based on routing information (output port number and other information) stored in an input cell. The switch also outputs a cell according to a transmission capacity of the output side.

The output buffer type ATM switch 200 includes a switch unit 210, output buffer units 220 and congestion monitoring units 230 connected to the respective output buffer units. The switch unit 210 switches (self-switching) a cell received from each input buffer 100 through an input port to a predetermined output port based on routing information assigned to the cell. The output buffer unit 220 is provided for each output port of the switch unit 210 and has a plurality of buffer memories therein corresponding to the order of priority based on delay quality classes. The congestion monitoring unit 230 is provided for each output buffer 220 and outputs an output buffer threshold value exceeding signal S0 when the amount of cells accumulated in the buffer memory in each output buffer unit 220 exceeds a predetermined threshold value. The output buffer threshold value exceeding signal S0 output from the congestion monitoring unit 230 is fed back to the input buffer unit 100.

The input buffer unit 100 includes a write control unit 120, queues 110 and a read control unit 130. The queue 110 is a logic queue virtually provided, in a buffer memory, corresponding to a delay quality class and each output port of the switch unit 210 for temporarily storing an input cell. The write control unit 120 writes an input cell to a queue 110 corresponding to a delay quality class and an output port number assigned to the input cell according to the amount of cells accumulated in each queue 110. The read control unit 130 receives input of the amount of cells accumulated in each queue 110 and an output buffer threshold value exceeding signal S0 output from the congestion monitoring unit 230, and reads and transmits a cell from a predetermined queue 110 to the switch unit 210 in response to the output buffer threshold value exceeding signal S0.

Figure 5:
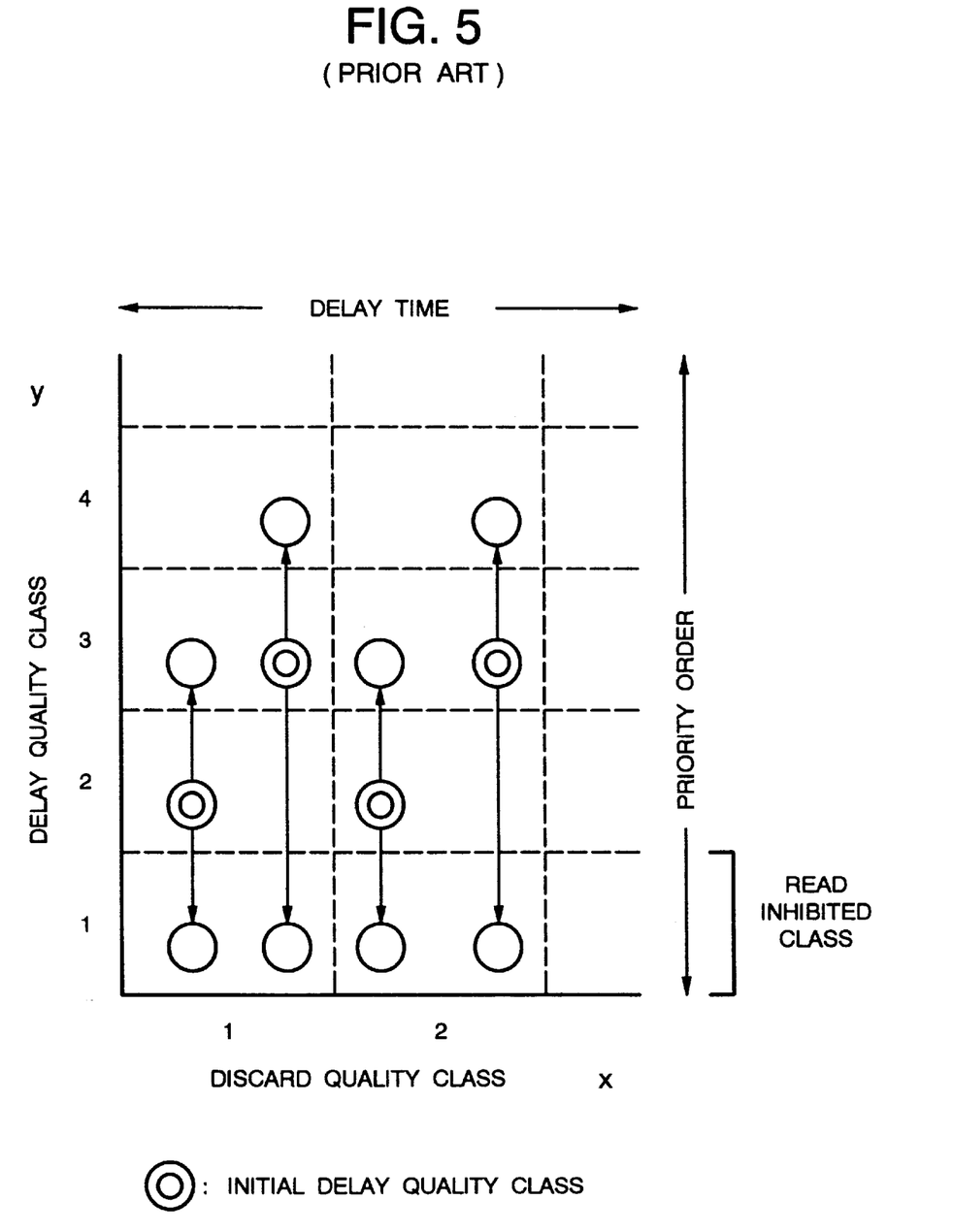
FIG. 5 is a diagram showing reading priority order based on delay quality classes.

FIG. 5 is a diagram for use in explaining reading priority order based on delay quality classes in the ATM cell buffer circuit of FIG. 4. With reference to FIG. 5, a discard quality class and a delay quality class assigned to an input cell are represented by a matrix of priority class CL(x, y). The figure shows that the lower the discard quality class x assigned to an input cell is, the more liable the cell is to be discarded to have a higher discard rate and that to the contrary, the higher the discard quality class x is, the less liable the cell is to be discarded to have a lower discard rate. The figure also shows that the lower a delay quality class y is, the harder the cell is to be read to have a longer delay time and that to the contrary, the higher the delay quality class y is, the easier the cell is to be read to have a shorter delay time.

Description will be next made of operation of the read control unit 130 in the input buffer unit 100 with reference to FIG. 5. At each input buffer unit 100, the queues 110 are logically divided into (the number of output ports of the switch unit 210: N)×(the number of initial delay quality classes: y−2). Assuming that delay quality classes in FIG. 5 are '1' to '4', an initial delay quality class of each queue 110 is fixedly determined to be '2' or '3' at the initial setting of the ATM switch. This value can not be modified.

The read control unit 130 has a state control table to be referred to for the reading of cells from the queues 110 and controls such that when the number of cells accumulated in each queue 110 exceeds a threshold value, a delay quality class of the queue 110 is upgraded from '2' to '3' or from '3' to '4' and on the reception of an output buffer threshold value exceeding signal from the congestion monitoring unit 230, the value of a delay quality class of a queue 110 corresponding to the output port in question is reduced to "1". Cell reading is conducted by sequentially confirming whether cells are accumulated in the queues 110 in the descending order of the classes, starting with a queue 110 whose delay quality class is '4', the highest, and reading cells of a queue 110 of a class in question when cells are accumulated. When there exist a plurality of queues 110 of the same delay quality class where cells are accumulated, one queue 110 is equally selected under round robin priority control, from which cells are read. When no cell is accumulated in queues 110 whose delay quality class values are '4', '3', and '2' and cells are accumulated in a queue 110 whose delay quality class value is '1', idle cells are transmitted to the switch unit 210 without execution of cell reading from the queue 110.

The above-described conventional ATM cell buffer circuit, however, has a drawback that in a state where services are being provided without using all the delay quality classes which the ATM cell switching device has, when service of a new delay quality class is to be added, if the delay quality class to be assigned to the additional service fails to coincide with an unused delay quality class, such laborious work is necessary as suspension of the service of a delay quality class which is already being provided or re-routing of connections because relative positioning of the priority for reading cells from the respective queues 110 is fixed.

Further description will be made with respect to a concrete example. It is assumed that the respective queues 110 at the input buffer unit 100 have three delay quality classes which are referred to as Qos#1, Qos#2 and Qos#3, respectively. Assuming that the number of delay quality classes of the queues 110 is three, a value of the delay quality class y managed by the read control unit 130 ranges from '1' to '5' and a value of the initial delay quality class to be assigned to the three delay quality classes will accordingly range from '2' to '4'. If at the start of the services, only two of the three delay quality classes need to be used and when at the time of addition of an unused delay quality class, its priority over the existing two delay quality classes is unknown, conditions of using two classes among the initial delay quality class values from '2' to '4' can not be determined. Therefore, it is assumed that a delay quality class with the value of '2' whose reading priority is low is not to be used and delay quality classes with the values of '3' and '4' are to be used. As described above, it is also assumed in the conventional art that correspondence between delay quality classes Qos#1, Qos#2 and Qos#3 and initial delay quality class values from '2' to '4' at each queue 110 is fixed and that the initial delay quality class value of Qos#1 is '2', the initial delay quality class value of Qos#2 is '3' and the initial delay quality class value of Qos#3 is '4'. In other words, at the start of the service, queues 110 having the delay quality classes Qos#2 and Qos#3 are to be used and a queue 110 having the delay quality class Qos#1 is yet to be used.

Under these conditions, when with respect to, for example, a queue 110 of the delay quality class Qos#2 whose service is being already provided, a total of 300 connections are routed, 100 for a queue 110 directed to a switch output port [0], 100 for a queue 110 directed to a switch output port [1] and 100 for a queue 110 directed to a switch output port [2], the following procedure is necessary to set a delay quality class of the service to be newly started between two delay quality classes whose services are being already provided.

First, temporarily stop services (cell conduction) at all of the 300 connections for the queue 110 of the delay quality class Qos#2. Then, newly set the routing of the 300 connections to a queue 110 of the delay quality class Qos#1 directed to the switch output port [0], a queue 110 of the same class directed to the switch output port [1] and a queue 110 of the same class directed to the switch output port [2]. Then, resume the services (cell conduction), and further, set routing of connections for the new service to queues 110 of the delay quality class Qos#2 directed to the respective switch output ports to start the new service.

SUMMARY OF THE INVENTION

An object of the present invention is to provide an ATM cell buffer circuit and a priority order allocating method at an ATM switching system enabling addition of service of a new delay quality class without stopping the existing services, irrespective of the positioning of the new delay quality class of the service.

According to the first aspect of the invention, an ATM cell buffer circuit which conducts priority control of the order of transmission of ATM cells at the time of occurrence of ATM cell congestion, comprises an output buffer type ATM switch for switching ATM cells and an input buffer unit provided for each line, the output buffer type ATM switch comprises switching means for switching a cell received from each input buffer unit through an input port to a predetermined output port based on routing information assigned to the cell, output buffer means provided for each output port of the switching means and having a plurality of buffer memories therein corresponding to the order of priority based on delay quality classes, and congestion monitoring means provided for each the output buffer means for, when the amount of cells accumulated at the buffer memory in the output buffer means exceeds a threshold value, notifying the input buffer unit of the excess, and the input buffer unit comprises queues provided divisionally in terms of logic corresponding to the respective output ports of the switching means of the output buffer type ATM switch and the respective cell reading priority classes and disposed at the input ports of the output buffer type ATM switch for temporarily storing an input cell, write control means for queuing the input cell to its corresponding queue based on routing information assigned to the input cell, and read control means for selecting a queue whose cell reading priority order is the highest among the queues where cells are accumulated based on the amount of cells accumulated at each the queue and the notification from the congestion monitoring means, reading a cell from the selected queue and transmitting the same to the switching means at each timing of transmitting a cell to the output buffer type ATM switch, wherein the read control means comprises a state control table to be referred to for the reading of a cell from the queue, a delay quality class setting table for setting cell reading priority for each priority class indicative of a discard quality class and a delay quality class assigned to an input cell, table value modifying means for modifying a set value of the delay quality class setting table as required, and cell reading means for determining the order of priority to read a cell based on the delay quality class setting table and the state control table.

In the preferred construction, the delay quality class setting table stores the order of reading priority of each delay quality class at the queues logically divided into (the number of output ports of the switching means: N)×(the number of delay quality classes: y–2), a set value of which can be arbitrarily modified in the range from '2' to 'y–1'.

In the preferred construction, the table value modifying unit time-divisionally provides, within a time for transmitting one cell from the input buffer unit to the switching means of the output buffer type ATM switch, a time slot for modifying a set value of the delay quality class setting table and a time slot for selecting the queue which will transmit a cell to the switching means to modify a set value of the delay quality class setting table.

In another preferred construction, the delay quality class setting table stores the order of reading priority of each delay quality class at the queues logically divided into (the number of output ports of the switching means: N)×(the number of delay quality classes: y–2), a set value of which can be arbitrarily modified in the range from '2' to 'y–1', and the table value modifying unit time-divisionally provides, within a time for transmitting one cell from the input buffer unit to the switching means of the output buffer type ATM switch, a time slot for modifying a set value of the delay quality class setting table and a time slot for selecting the queue which will transmit a cell to the switching means to modify a set value of the delay quality class setting table.

In another preferred construction, the read control means, at the time of reading of a cell from the queue, when there exists only one the queue of the same priority class where cells are accumulated, reads a cell from the queue and transmits the same to the switching means, when there exit a plurality of the queues of the same priority class where cells are accumulated, equally selects one the queue by round robin priority control to read a cell and transmit the same to the switching means, and when no cell is accumulated in each queue, transmits an idle cell to the switching means.

According to the second aspect of the invention, a priority order allocating method of conducting priority control of the order of transmission of ATM cells at the time of occurrence of ATM cell congestion in an ATM switching system, comprising the steps of:

queuing an input cell to its corresponding queue based on routing information assigned to the input cell, selecting a queue whose cell reading priority order is the highest among the queues where cells are accumulated based on the amount of cells accumulated at each the queue and reading a cell from the selected queue at each timing of transmitting a cell, switching the cell read from the selected queue to a output port based on routing information assigned to the cell, and detecting cell congestion of the cell switched to the output port and notifying the reading step of the cell congestion as a congestion information, wherein the reading step includes setting cell reading priority for each priority class indicative of a discard quality class and a delay quality class assigned to an input cell to make a delay quality class setting table, modifying a set value of the delay quality class setting table as required, determining the order of priority to read a cell based on the delay quality class setting table and the congestion information.

In this case, at the table value modifying step, a time slot for modifying a set value of the delay quality class setting table and a time slot for selecting the queue which will transmit a cell are time-divisionally provided at each timing of transmitting a cell.

According to another aspect of the invention, a computer readable memory having a control program for conducting priority control of the order of transmission of ATM cells at the time of occurrence of ATM cell congestion in a ATM system, the control program comprising the steps of:

queuing an input cell to its corresponding queue based on routing information assigned to the input cell;

selecting a queue whose cell reading priority order is the highest among the queues where cells are accumulated based on the amount of cells accumulated at each the queue and reading a cell from the selected queue at each timing of transmitting a cell;

switching the cell read from the selected queue to a output port based on routing information assigned to the cell; and detecting cell congestion of the cell switched to the output port and notifying the reading step of the cell congestion as a congestion information;

wherein the reading step includes setting cell reading priority for each priority class indicative of a discard quality class and a delay quality class assigned to an input cell to make a delay quality class setting table, modifying a set value of the delay quality class setting table as required, determining the order of priority to read a cell based on the delay quality class setting table and the congestion information.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

An ATM cell buffer circuit according to one embodiment of the present invention, similarly to the conventional ATM cell buffer circuit shown in FIG. 4, includes an input buffer unit 100 provided for each line and an output buffer type ATM switch 200. The output buffer type ATM switch 200 includes a switch unit 210, an output buffer unit 220 and a congestion monitoring unit 230 connected to each output buffer unit, and the input buffer unit 100 includes a write control unit 120, a queue 110 and a read control unit 10. Since these components, except for the read control unit 10, are the same as their counterpart components in the conventional ATM cell buffer circuit shown in FIG. 4, the same reference numerals are allotted thereto to omit their description.

Figure 1:
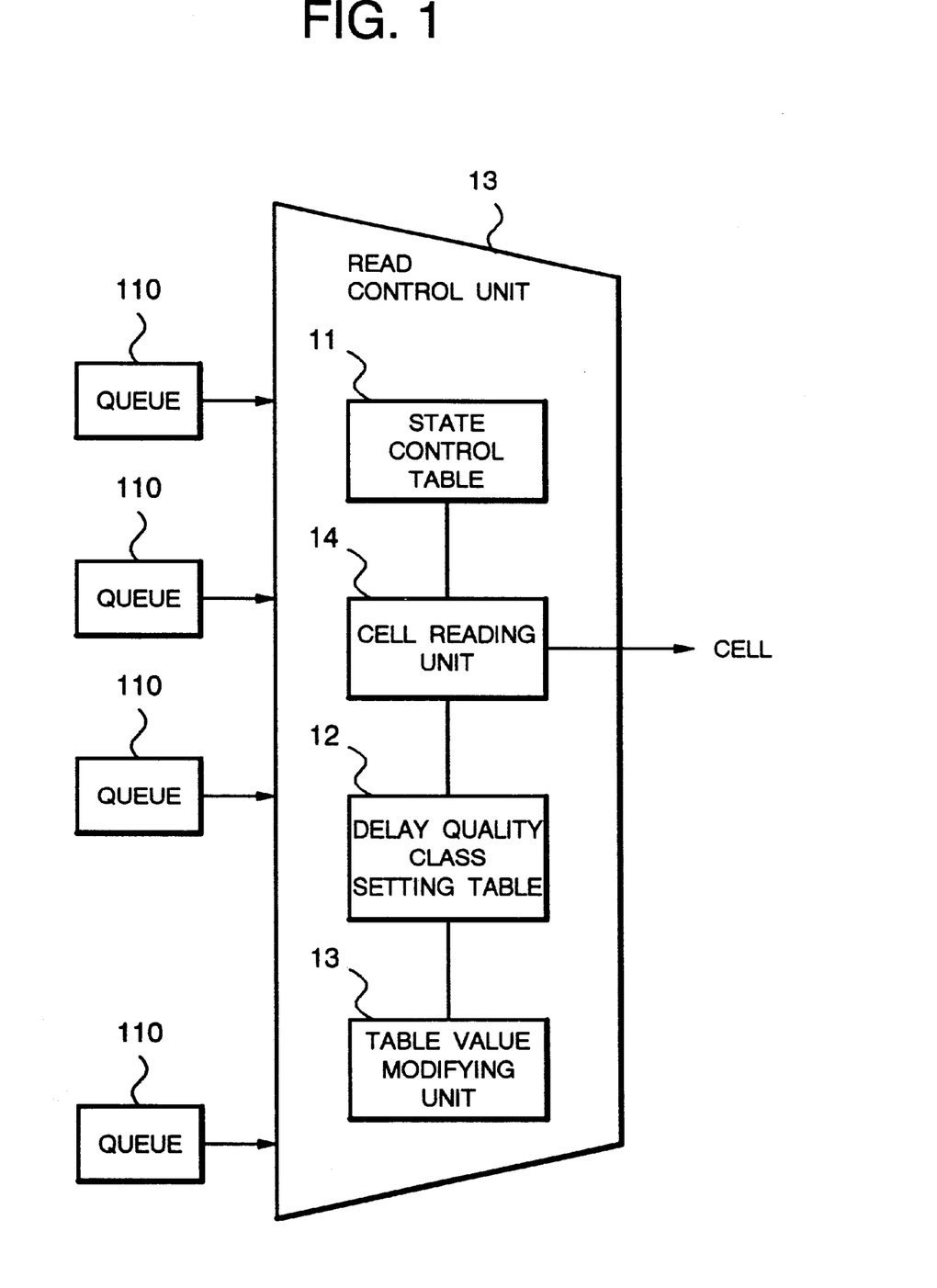
FIG. 1 is a block diagram showing structure of a read control unit of an ATM cell buffer circuit according to one embodiment of the present invention.

Structure of the read control unit 10 in the input buffer unit 100 according to the present embodiment is shown in FIG. 1. With reference to FIG. 1, the read control unit 10 of the present embodiment includes a state control table 11 to be referred to for the reading of a cell from the queue 110, a delay quality class setting table 12 for setting cell reading priority for each priority class indicative of a discard quality class and a delay quality class assigned to an input cell, a table value modifying unit 13 for modifying a set value of the delay quality class setting table 12 as required, and a cell reading unit 14 for determining the priority order based on the delay quality class setting table 12 and the state control table 11 to read a cell. This arrangement provides, in addition to a function of controlling read according to the priority order based on delay quality classes of the respective queues 110, a function of arbitrarily modifying the order of priority of each queue 110. In FIG. 1, illustration is made only of a characteristic part of the structure of the present embodiment and that of the remaining common part is omitted. The read control unit 10 is implemented by a program-controlled LSI or other processing device. The control program is provided as storage in a storage medium such as a magnetic disk or a semiconductor memory.

Figure 2:
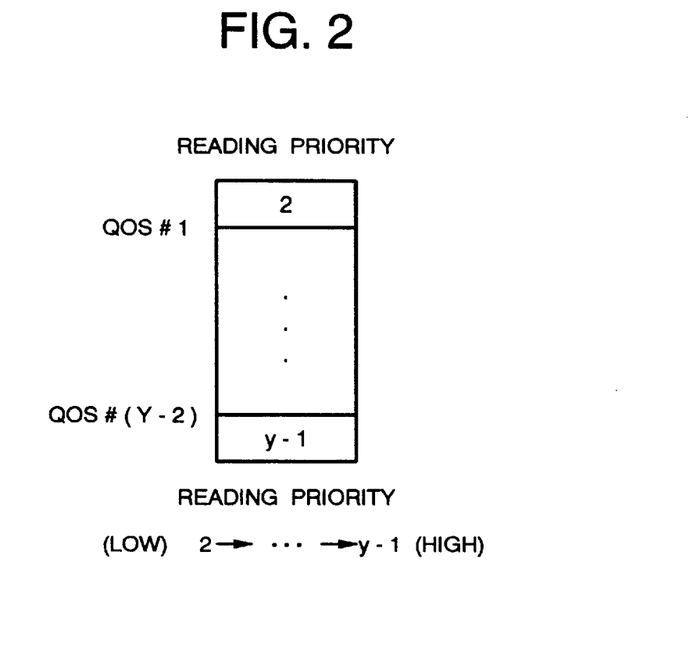
FIG. 2 is a diagram showing structure of a delay quality class setting table according to the present embodiment.

The delay quality class setting table 12 is a table which stores the order of priority for reading each delay quality class at the queues 110 logically divided into (the number of output ports of the switch unit 210: N)×(the number of delay quality classes: y−2). FIG. 2 shows structure of the delay quality class setting table 12. Value of the delay quality class setting table 12 can be arbitrarily changed within the range from '2' to 'y−1' and a set value is reflected on an initial delay quality class value.

Figure 3:
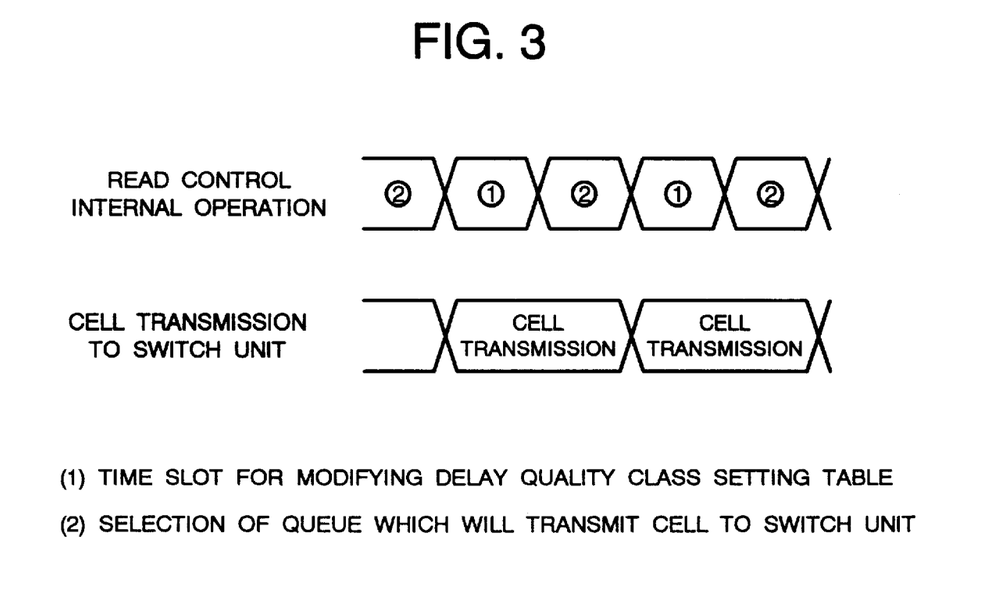
FIG. 3 is a timing chart showing a relationship between internal operation of the read control unit and cell transmission processing in the present embodiment.

The table value modifying unit 13, with a time slot for modifying a set value of the delay quality class setting table 12 and a time slot for selecting a queue 110 which will send a cell to the switch unit 210 time-divisionally set within a time for sending one cell from each input buffer unit 100 to the switch unit 210, arbitrarily modifies a set value of the delay quality class setting table 12 without affecting selection of a queue 110 which will send a cell to the switch unit 210 by the cell reading unit 14. Detailed description of the operation by the table value modifying unit 13 will be described later.

The cell reading unit 14, at the time of selection of a queue 110 which will send a cell to the switch unit 210, controls read based on delay quality classes according to the state control table as is done in conventional art, as well as selecting a queue 110 whose cell reading priority set at the delay quality class setting table 12 is high among queues 110 where cells are accumulated and reading and sending cells from the queue 110.

The read control unit 130 has a state control table to be referred to for the reading of cells from the queues 110 and controls such that when the number of cells accumulated in each queue 110 exceeds a threshold value, a delay quality class of the queue 110 is upgraded from '2' to '3' or from '3' to '4' and on the reception of an output buffer threshold value exceeding signal from the congestion monitoring unit 230, the value of a delay quality class of a queue 110 corresponding to the output port in question is reduced to "1". Cell reading is conducted by sequentially confirming whether cells are accumulated in the queues 110 in the descending order of the classes, starting with a queue 110 whose delay quality class is '4', the highest, and reading cells of a queue 110 of a class in question when cells are accumulated. When there exist a plurality of queues 110 of the same delay quality class where cells are accumulated, one queue 110 is equally selected under round robin priority control, from which cells are read. When no cell is accumulated in queues 110 whose delay quality class values are '4', '3', and '2' and cells are accumulated in a queue 110 whose delay quality class value is '1', idle cells are transmitted to the switch unit 210 without execution of cell reading from the queue 110.

Description will be next made of operation of the ATM cell buffer circuit according to the present embodiment with respect to the same concrete example as that described in the Related Art. More specifically, it is assumed that the respective queues 110 have three delay quality classes which are referred to as Qos#1, Qos#2 and Qos#3, respectively. Assuming that the number of delay quality classes is three, a value of the delay quality class y managed by the read control unit 130 ranges from '1' to '5' and a value of the initial delay quality class to be assigned to the three delay quality classes will accordingly range from '2' to '4'. If at the start of the services, only two of the three delay quality classes need to be used and when at the time of addition of an unused delay quality class, its priority over the existing two delay quality classes is unknown, conditions of using two classes among the initial delay quality class values from '2' to '4' can not be determined. Therefore, it is assumed that a delay quality class with the value of '2' whose reading priority is low is not to be used and delay quality classes with the values of '3' and '4' are to be used. Setting of a delay quality class to be used is conducted by the cell reading unit 14 of the read control unit 10. More specifically, assuming that at the initial state, the initial delay quality class value of Qos#1 is '2', the initial delay quality class value of Qos#2 is '3' and the initial delay quality class value of Qos#3 is '4', queues 110 having the delay quality classes Qos#2 and Qos#3 are to be used and a queue 110 having the delay quality class Qos#1 is yet to be used.

Next, at the time of setting of a delay quality class of the service to be newly started between two delay quality classes whose services are being already provided, the table value modifying unit 13 changes, with respect to the queue 110 of the delay quality class Qos#2 whose initial delay quality class value is '3', the initial delay quality class value to '2' at the delay quality class setting table 12 and with respect to the queue 110 of the delay quality class Qos#1 whose initial delay quality class value is '2', changes the initial delay quality class value to '3'. Then, the routing of a desired number of connections with respect to the queue 110 of the delay quality class Qos#1 is set to the queue 110 directed to the switch output port [0], the queue 110 directed to the switch output port [1] and the queue 110 directed to the switch output port [2], the new service is started.

The foregoing operation enables addition of service to be newly started between two delay quality classes whose services are being already provided without stopping services which are being already provided or resetting the routing of the connections for such services.

As described in the foregoing, according to the ATM cell buffer circuit and the priority order allocating method at an ATM switching system of the present invention, the priority of reading of cells accumulated at each queue can be arbitrarily modified. When new service is to be added, this enables arbitrary setting of a delay quality class of the service to be added with respect to delay quality classes of services which are already being provided, thereby allowing desired priority to be given to the reading of cells in a queue related to the service. As a result, it is possible to add service having an arbitrary delay quality class without affecting the services which are being already provided.

The present invention also allows arbitrary addition of service whose delay quality class has any positioning with respect to delay quality classes of the existing services within the range of the number of delay quality services prepared at the device. At the time of provision of delay quality service classes in stages, therefore, this eliminates the need of determining the order of provision and a correlation between classes of delay quality services, thereby enabling various services to be flexibly provided.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An ATM cell buffer circuit which conducts priority control of the order of transmission of ATM cells at the time of occurrence of ATM cell congestion, comprising:

an output buffer type ATM switch that switches ATM cells and an input buffer unit provided for each line;

said output buffer type ATM switch comprising, a switching unit that switches one of the cells received from said input buffer unit through an input port to a predetermined output port based on routing information assigned to the one cell, an output buffer unit provided for said output port of said switching unit and having a plurality of buffer memories therein corresponding to an order of priority based on delay quality classes, and a congestion monitoring unit provided for each output buffer unit that, when the amount of cells accumulated at the buffer memory in said output buffer unit exceeds a threshold value, notifies said input buffer unit, and said input buffer unit comprising, a plurality of queues provided divisionally in terms of logic corresponding to the respective output ports of said switching unit of said output buffer type ATM switch and the respective cell reading priority classes, and disposed at said input port of said output buffer type ATM switch to temporarily store an input cell, a write control unit that queues said input cell to its corresponding queue based on routing information assigned to the input cell, and a read control unit that selects a queue whose cell reading priority order is the highest among said queues where said cells are accumulated, based on the amount of cells accumulated at each queue and the notification from said congestion monitoring unit, reads a cell from the selected queue and transmits said cell to said switching unit at each timing of transmitting a cell to said output buffer type ATM switch without any substantial stoppage of service, wherein said read control unit comprises, a state control table to be referred to for reading said input cell from said queue, a delay quality class setting table that sets cell reading priority for each priority class indicative of a discard quality class, a delay quality class and an initial delay quality class assigned to an input cell, a table value modifying unit that modifies a set value of said delay quality class setting table, and a cell reading unit that determines the order of priority to read said input cell based on said delay quality class setting table and said state control table.

2. The ATM cell buffer circuit as set forth in claim 1, wherein said delay quality class setting table stores the order of reading priority of each delay quality class at said queues logically divided into (the number of output ports of said switching unit: N)×(the number of delay quality classes: y–2), a set value of which can be arbitrarily modified in the range from '2' to 'y–1'.

3. The ATM cell buffer circuit as set forth in claim 1, wherein said table value modifying unit time-divisionally provides, within a time for transmitting said one cell from said input buffer unit to said switching unit of said output buffer type ATM switch, a time slot that modifies a set value of said delay quality class setting table, and a time slot that selects said queue which will transmit a cell to said switching unit to modify a set value of said delay quality class setting table.

4. The ATM cell buffer circuit as set forth in claim 1, wherein said delay quality class setting table stores the order of reading priority of each delay quality class at said queues logically divided into (the number of output ports of said switching unit: N)×(the number of delay quality classes: y–2), a set value of which can be arbitrarily modified in the range from '2' to 'y–1', and said table value modifying unit time-divisionally provides, within a time for transmitting said one cell from said input buffer unit to said switching unit of said output buffer type ATM switch, a time slot that modifies a set value of said delay quality class setting table, and a time slot that selects said queue which will transmit a cell to said switching unit to modify a set value of said delay quality class setting, table.

5. The ATM cell buffer circuit as set forth in claim 1, wherein sad read control unit, at the time of reading of said input cell from said one of said plurality of queues, when there exists only one said queue of the same priority class where cells are accumulated, reads a cell from the queue and transmits said cell to said switching unit, when there exists said plurality of said queues of the same priority class where cells are accumulated, equally selects one of said queues by round robin priority control to read a cell and transmit said cell to said switching unit, and when no cell is accumulated in each of said queues, transmits an idle cell to said switching unit.

6. The ATM cell buffer circuit of claim 1, wherein said read control unit substantially eliminates resetting of routing connections.

7. The ATM cell buffer circuit of claim 1, wherein said table value modifying unit allows substantially continuous cell traffic.

8. A priority order allocating method of conducting priority control of the order of transmission of ATM cells at the time of occurrence of ATM cell congestion in an ATM switching system, comprising the steps of:

queuing an input cell to its corresponding queue from a plurality of queues based on routing information assigned to the input cell;

selecting a queue from said queues whose cell reading priority order is the highest among said queues where said cells are accumulated based on the amount of cells accumulated at each of said queues, and reading one of said cells from the selected queue at each timing of cell transmission;

switching said cell read from said selected queue to an output port based on routing information assigned to the cell; and detecting cell congestion of said cell switched to said output port, and notifying said reading step of the cell congestion as congestion information;

wherein said reading step does not require stoppage of service and includes:
setting a cell reading priority for each priority class indicative of a discard quality class and a delay quality class assigned to an input cell to make a delay quality class setting table,
modifying a set value of said delay quality class setting table, and
determining the order of priority to read one of said cells based on said delay quality class setting table and said congestion information.

9. A priority order allocating method as set forth in claim 8, wherein
at said table value modifying step, a time slot that modifies a set value of said delay quality class setting table and a time slot that selects said queue which will transmit said input cell are time-divisionally provided at each timing of a cell transmission.

10. The method of claim 8, wherein said reading step substantially eliminates resetting of routing connections.

11. The method of claim 8, wherein said modifying step allows substantially continuous cell traffic.

12. A computer readable memory having a control program that conducts priority control of the order of transmission of ATM cells at the time of occurrence of ATM cell congestion in a ATM system, said control program comprising the steps of:
queuing an input cell to a corresponding one of a plurality of queues based on routing information assigned to the input cell;
selecting one of said queues whose cell reading priority order is the highest among said queues, where said cells are accumulated based on the amount of cells accumulated at each said queue, and reading one of said cells from the selected queue at each timing of cell transmission;
switching said cell read from said selected queue to an output port based on said routing information assigned to the input cell; and
detecting cell congestion of said cell switched to said output port, and notifying said reading step of the cell congestion as congestion information;
wherein said reading step does not require stoppage of service and includes:
setting cell reading priority for each priority class indicative of a discard quality class and a delay quality class assigned to said input cell to make a delay quality class setting table, modifying a set value of said delay quality class setting table, and
determining the order of priority to read said input cell based on said delay quality class setting table and said congestion information.

13. The computer readable memory having the control program as set forth in claim 12, wherein
at said table value modifying step, a time slot that modifies a set value of said delay quality class setting table and a time slot that selects said queue which will transmit said input cell are time-divisionally provided at each timing of a cell transmission.

14. The memory of claim 12, wherein said reading step substantially eliminates resetting of routing connections.

15. The memory of claim 12, wherein said modifying step allows substantially continuous cell traffic.

16. An ATM cell buffer circuit, comprising an input buffer unit that operates without a substantial stoppage of service, said input buffer unit comprising:
a write control unit that receives an input cell and queues said input cell into one of a plurality of queues in accordance with routing information of said input cell, each of said queues having a reading priority order; and
a read control unit that selects one of said queues having the highest reading priority order among said queues, reads a cell from said selected queue, and transmits said cell to an output buffer type ATM switch that switches said ATM cells, said read control unit comprising,
a state control table configured for reading said read cell from said selected queue,
a delay quality class setting table that sets said a reading priority for each priority class in accordance with a discard quality class and a delay quality class assigned to said input cell,
a table value modifying unit that is coupled to said delay quality class setting table and modifies said reading priority, and
a cell reading unit that is coupled between said state control table and said delay quality class setting table and determines said reading priority order in accordance with said state control table and said delay quality class setting table.

17. The ATM cell buffer circuit of claim 16, wherein said read control unit operates without substantially stopping conduction of cells.

18. The ATM buffer circuit of claim 16, wherein said read control unit substantially eliminates a need to reset routing connections.

19. The ATM buffer circuit of claim 16, wherein said table value modifying unit time-divisionally generates a first time slot that modifies a set value of said delay quality class setting table, and a second time slot that selects said queue to transmit a cell to said output buffer type ATM switch to modify said set value without stopping cell traffic.

20. The ATM buffer circuit of claim 16, wherein:
said read control unit transmits a cell from one of said queues to said output switch when there is only one queue for a priority class;
said read control unit selects a queue by round robin priority control and transmits a cell from said selected queue from one of said queues to said output switch when a plurality of queues exists for said priority class; and
said read control unit transmits an idle cell when said selected queue contains no cell.

* * * * *